United States Patent
Hu et al.

(10) Patent No.: US 12,221,950 B2
(45) Date of Patent: Feb. 11, 2025

(54) BLADE APPARATUS FOR WIND POWER GENERATION AND WIND POWER GENERATION DEVICE

(71) Applicant: Sany Renewable Energy Co., Ltd., Beijing (CN)

(72) Inventors: Jie Hu, Beijing (CN); Jiaotong Jin, Beijing (CN); Xin Cao, Beijing (CN)

(73) Assignee: Sany Renewable Energy Co., Ltd., Beijing (CN)

(*) Notice: Subject to any disclaimer, the term of this patent is extended or adjusted under 35 U.S.C. 154(b) by 86 days.

(21) Appl. No.: 18/150,989

(22) Filed: Jan. 6, 2023

(65) Prior Publication Data
US 2024/0035439 A1    Feb. 1, 2024

(30) Foreign Application Priority Data
Aug. 1, 2022 (CN) .......................... 202210918264.X

(51) Int. Cl.
*F03D 1/06* (2006.01)
*H02K 7/18* (2006.01)

(52) U.S. Cl.
CPC .......... *F03D 1/0658* (2013.01); *F03D 1/0675* (2013.01); *H02K 7/183* (2013.01); *F05B 2220/706* (2013.01)

(58) Field of Classification Search
CPC .... F03D 1/0658; F03D 1/0675; F03D 1/0633; F05B 2240/30
See application file for complete search history.

(56) References Cited

U.S. PATENT DOCUMENTS

| | | | |
|---|---|---|---|
| 4,260,332 A * | 4/1981 | Weingart | F03D 1/0658 416/226 |
| 2010/0171317 A1 * | 7/2010 | Trede | F03D 1/0658 290/55 |

(Continued)

FOREIGN PATENT DOCUMENTS

| | | |
|---|---|---|
| CN | 203730225 U | 7/2014 |
| CN | 205479032 U | 8/2016 |

(Continued)

OTHER PUBLICATIONS

Extended European Search Report issued in counterpart European Patent Application No. 23151035.5, dated Oct. 30, 2023.

*Primary Examiner* — David E Sosnowski
*Assistant Examiner* — Aye S Htay
(74) *Attorney, Agent, or Firm* — Westbridge IP LLC

(57) ABSTRACT

Disclosed is a blade apparatus for wind power generation, which includes: a blade body, one end thereof being provided with a blade-root connecting portion; and a blade root assembly, including a plurality of blade root segments arranged in a circumferential direction of the blade body to form a body of revolution, each blade root segment being detachably connected to a corresponding portion of the blade-root connecting portion. The blade root assembly with a plurality of blade root segments is adopted, so that the dimension of a single blade root segment is greatly reduced, thus effectively reducing the difficulties in manufacture and transportation. Meanwhile, the overall dimension of the blade root assembly can be further increased to match with a larger blade body, which is beneficial to further improve the swept area of blade and generated output of wind power generation device.

14 Claims, 8 Drawing Sheets

(56) References Cited

U.S. PATENT DOCUMENTS

| | | | |
|---|---|---|---|
| 2012/0315143 A1* | 12/2012 | Grove-Nielsen | ....... F03D 13/10 |
| | | | 416/212 A |
| 2013/0177428 A1* | 7/2013 | Zeller | ................... F03D 1/0658 |
| | | | 416/219 A |
| 2013/0183158 A1 | 7/2013 | Giuffre | |
| 2013/0330197 A1* | 12/2013 | Feigl | ........................ F01D 5/30 |
| | | | 29/889.7 |
| 2015/0003986 A1 | 1/2015 | Minadeo et al. | |
| 2016/0290313 A1* | 10/2016 | Zwart | ................... F03D 1/0658 |
| 2017/0022968 A1* | 1/2017 | Caruso | .................... F03D 1/065 |
| 2018/0313326 A1* | 11/2018 | Trede | ................... F03D 1/0675 |

FOREIGN PATENT DOCUMENTS

| | | |
|---|---|---|
| CN | 110439743 A | 11/2019 |
| CN | 113685309 A | 11/2021 |
| CN | 113787658 A | 12/2021 |
| EP | 3907062 A1 | 11/2021 |
| WO | 2021121497 A1 | 6/2021 |

\* cited by examiner

BLADE APPARATUS FOR WIND POWER GENERATION AND WIND POWER GENERATION DEVICE

CROSS-REFERENCE TO RELATED APPLICATION

This application claims priority to Chinese Patent Application No. 202210918264.X, filed on Aug. 1, 2022, which is hereby incorporated by reference in its entirety.

TECHNICAL FIELD

This application relates to a technical field of a wind power generation device, and particularly relates to a blade apparatus for wind power generation and a wind power generation device.

BACKGROUND

In a wind power generation device, a blade is generally connected to a hub of a main body through a blade root. For a traditional blade apparatuses, the blade and the blade root are usually formed integrally by infusion molding. However, with the increase of generated output and swept area of the blade, the length of the blade further increases, and the dimension of the blade root also increases, which also increases the difficulty of manufacture. Moreover, because the blade apparatus is transported mainly by land vehicles at present, the large dimension of the blade apparatus comes to a great difficulty of transportation. Especially, the blade root is of the maximum radial dimension in the overall structure, which is restricted by a height limit, a width limit and other relevant regulations during transportation.

Some blade apparatus in the related art adopt the scheme of split manufacturing the blade and the blade root, and the blade and the blade root are dealt with separately during manufacture and transportation. Although this scheme can reduce the length to a certain extent, the difficulties in manufacture and transportation caused by height and width still exist, which is not conducive to the further development and improve of wind power generation device.

SUMMARY

In view of this, to solve the problems of manufacture and transportation difficulties caused by the increased dimension of the blade apparatus in the related art, the application provides a blade apparatus for wind power generation and a wind power generation device.

The first aspect of the application provides a blade apparatus for wind power generation. The blade apparatus for wind power generation includes: a blade body, one end thereof being provided with a blade-root connecting portion; and a blade root assembly, including a plurality of blade root segments, the plurality of blade root segments being arranged in a circumferential direction of the blade body to form a body of revolution, and each blade root segment being detachably connected to a corresponding portion of the blade-root connecting portion.

The beneficial effects of the above technical scheme of the present application are as follows.

the structure and assembly mode of the blade root assembly are improved, and the blade root assembly is decomposed into a plurality of blade root segments, and then assembled into the whole blade root assembly during assembly, so that the dimension of a single blade root segment is greatly reduced, thus effectively reducing the difficulties in manufacture and transportation, and avoiding the restrictions of height and width during transportation, so that the overall dimension of the blade root assembly can be further increased to match with a larger blade body, which is beneficial to further improve the swept area of blade and generated output of wind power generation device.

In addition, since the blade root assembly and the blade body are configured to be detachable, and since the blade root assembly can be disassembled into multiple components, for blade bodies and hubs with different dimensions and specifications, the connection can be realized by replacing the blade root assembly with corresponding dimension, so as to match the axial length of the blade body and the dimension of the connecting pitch circle of the hub, and to form the assembled combination of the standardized blade root body and the alternative blade root assembly, so that the blade apparatus for wind power generation 1 has stronger adaptability and higher assembly flexibility.

In a practicable implementation, a cross section of each blade root segment has an arc structure; in an axial direction of the blade root assembly, one end of each blade root segment is provided with a first connection structure matched with the blade-root connecting portion, and the other end of each blade root segment is provided with a second connection structure matched with a hub of wind power generation device.

In a practicable implementation, a diameter of an end of the blade root assembly used for being connected to the hub is equal to a diagram of an end of the blade root assembly used for being connected to the blade body.

In a practicable implementation, the blade root assembly has a cylindrical structure of being axially penetrated.

In a practicable implementation, a diameter of an end of the blade root assembly used for being connected to the hub is greater or less than a diagram of an end of the blade root assembly used for being connected to the blade body.

In a practicable implementation, the blade root assembly has a frustum structure of being axially penetrated.

In a practicable implementation, a plurality of the blade root segments have structures of a same dimension.

In a practicable implementation, a plurality of bolt connecting hole are provided on an end face of the blade-root connecting portion, and the plurality of the bolt connecting hole are arranged at intervals in a circumferential direction.

In a practicable implementation, the first connection structure includes a plurality of first bolt holes and a plurality of first studs, the plurality of first bolt holes are arranged at intervals in the circumferential direction, and arranged opposite to the plurality of bolt connecting holes; one end of each first stud is in threaded connection with corresponding one of the plurality of bolt connecting holes, and the other end of each first stud is in threaded connection with corresponding one of the plurality of bolt connecting holes.

In a practicable implementation, the second connection structure includes a plurality of second bolt holes and a plurality of second studs, the plurality of second bolt holes are arranged at intervals in the circumferential direction; one end of each the second stud is in threaded connection with corresponding one of the plurality of second bolt holes, and the other end of each second stud is in threaded connection with corresponding one of a plurality of connecting holes on the hub.

In a practicable implementation, the plurality of blade root segments are steel structures, the first bolt hole and the second bolt hole are formed by direct drilling.

In a practicable implementation, the plurality of blade root segments are fiber-reinforced plastic structures, and each end of each blade root segment is embedded with bolt sleeve structures. Bolt sleeve structures located at one end of each blade root segment are provided with the plurality of first bolt holes respectively, and bolt sleeve structures located at the other end of each blade root segment are provided with the plurality of second bolt holes, respectively.

In a practicable implementation, the blade apparatus for wind power generation further includes: a first flange ring, arranged between the blade root assembly and the blade body, the first flange ring being provided with a plurality of first through holes extending along an axial direction, and the plurality of first through holes being arranged at intervals in the circumferential direction, the plurality of first studs respectively passing through the plurality of first through holes and being connected to the blade root assembly and the blade body.

In a practicable implementation, the blade apparatus for wind power generation further includes: a second flange ring, arranged between the blade root assembly and the hub, the second flange ring being provided with a plurality of the second through holes, and the plurality of second through holes being arranged at intervals in the circumferential direction, the plurality of second studs respectively passing through the second through holes and being connected to the blade root assembly and the hub.

In a practicable implementation, the blade root assembly further includes a surface layer structure including a flexible cover and a fixed layer. The flexible cover is arranged in a circumferential direction of the blade root assembly and covers outer surfaces of the plurality of the blade root segments, and the fixing layer is formed by infusing an infusing material and covers outer surfaces of the flexible cover and the plurality of blade root segments.

In a practicable implementation, in a circumferential direction of the blade root assembly, a third connection structure is provided at a junction between adjacent two blade root segments, the adjacent two blade root segments are connected to each other by the third connection structure.

In a practicable implementation, the third connection structure includes: a slot structure, arranged at a side edge of one of the adjacent two blade root segments in the circumferential direction; and a hook structure, arranged at a position of the other one of the adjacent two blade root segments opposite to the slot structure in the circumferential direction, and the hook structure engaging with the slot structure.

The second aspect of the present application further provides a wind power generation device. The wind power generation device includes: a supporting tower; a main body, including a power generation apparatus and a hub, the main body being arranged on the supporting tower, and the hub being in transmission connection with an input end of the power generation apparatus; and at least one blade apparatus for wind power generation provided by the above-mentioned first aspect, and the at least one blade apparatus for wind power generation being connected to the hub.

DETAILED DESCRIPTION OF THE EMBODIMENTS

In the description of this application, "a plurality of" means at least two, such as two, three, etc., unless otherwise specifically defined. All directional indications (such as up, down, left, right, front, back, top, bottom, etc.) in this embodiment of the application are only used to explain the relative positional relationship, movement situation, etc. between components in a certain posture (as shown in the attached figure). If the specific posture changes, the directional indication changes accordingly. In addition, the terms "including" and "having" and any variations thereof are intended to cover non-exclusive inclusion. For example, a process, method, system, product or plant that includes a series of steps or units is not limited to the listed steps or units, but optionally also includes steps or units that are not listed, or optionally includes other steps or units inherent to these processes, methods, products or plants.

In addition, the reference to "an embodiment" here means that a specific feature, structure or characteristic described in connection with an embodiment can be included in at least one embodiment of this application. The appearance of this phrase in various places in the specification does not necessarily refer to the same embodiment, nor is it an independent or alternative embodiment mutually exclusive with other embodiments. It is understood explicitly and implicitly by those skilled in the art that the embodiments described herein can be combined with other embodiments.

The technical solutions in the embodiments of this application will be clearly and completely described below with reference to the drawings in the embodiments of this application. Obviously, the described embodiments are only part of the embodiments of this application, but not all of them. Based on the embodiments in this application, all other embodiments obtained by ordinary technicians in this field without creative work belong to the scope of protection in this application.

Some embodiments of a blade apparatus for wind power generation and a wind power generation device in the technical scheme of the present application are provided as follows.

Figure 1:
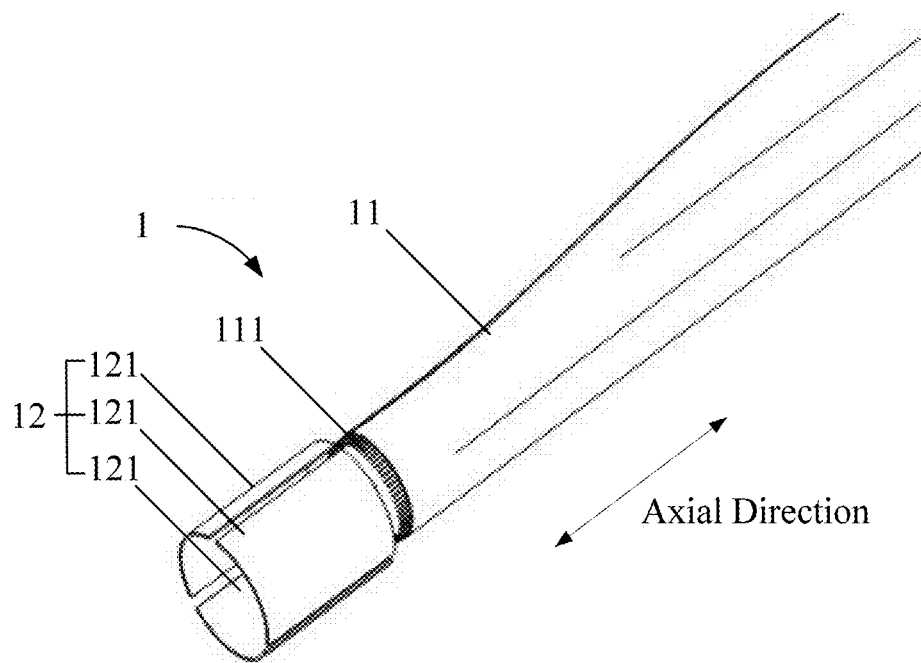
FIG. 1 shows an exploded schematic diagram of a part of a blade apparatus for wind power generation provided by an embodiment of the present application.
Figure 2:
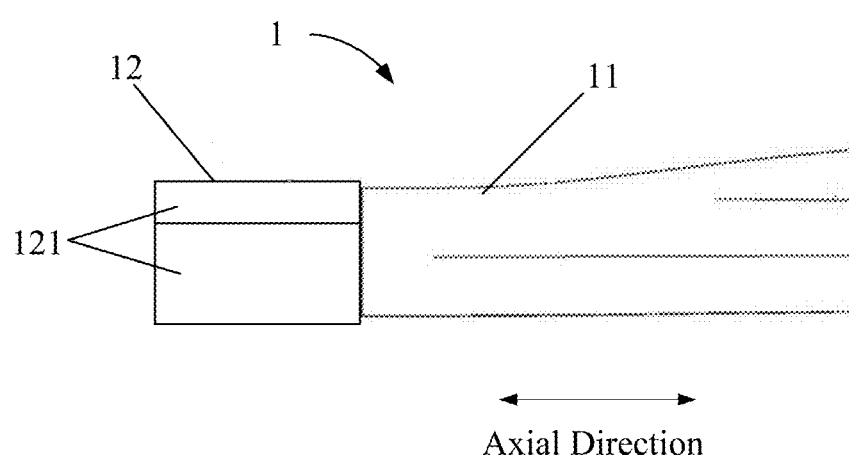
FIG. 2 shows a schematic diagram of a blade apparatus for wind power generation provided by an embodiment of the present application.

An embodiment of the first aspect of the present application provides a blade apparatus for wind power generation 1. As shown in FIGS. 1 and 2, the blade apparatus for wind power generation 1 includes a blade body 11 and a blade root assembly 12.

As shown in FIGS. 1 and 2, one end of the blade body 11 is provided with a blade-root connecting portion 111, and the blade root assembly 12 is detachably connected to the blade-root connecting portion 111 of the blade body 11, so as to realize the assembly between the blade root assembly 12 and the blade body 11, thereby realizing the connection and fixation between the blade body 11 and the hub of the wind power generation device through the blade root assembly 12; the blade body 11 drives the blade root assembly 12 and the hub to rotate under the wind force, so as to provide power for wind power generation device.

The blade root assembly 12 includes a plurality of split blade root segments 121. When connected to the blade body 11, the plurality of blade root segments 121 are arranged sequentially in the circumferential direction of the blade body 11 to form the blade root assembly 12 having a structure of a body of revolution, so as to be connected to the blade body 11 and the hub of the wind power generation device.

It can be understood that the generated output and swept area of the wind power generation device are related to the length of the blade body 11. The longer the blade body 11 is, the larger the swept area is, and correspondingly, the higher the generated output of wind power generation device is. However, a longer blade body 11 comes to a heavier weight, and causing a higher load borne by the blade root assembly 12. In order to meet the stress requirements, the overall size of the blade root assembly 12 needs to be correspondingly increased.

In the blade apparatus for wind power generation 1 in this embodiment, the structure and assembly mode of the blade root assembly 12 are optimized and improved. The blade root assembly 12 is formed by splicing a plurality of blade root segments 121, so that the dimension of a single blade root segment 121 is greatly reduced, and the manufacture and transportation can be carried out independently. The plurality of blade root segments 121 can be assembled together when they are mounted on the hub of wind power generation device, thus effectively reducing the difficulties in manufacture and transportation. Meanwhile, the overall dimension of the blade root assembly 12 can be further increased to match with the larger blade body 11, which is beneficial to further improve the swept area of blade and generated output of the wind power generation device.

In addition, since the blade root assembly 12 and the blade body 11 are configured to be detachable, and since the blade root assembly 12 can be disassembled into multiple components, when the blade bodies 11 with different sizes are being assembled with the hub, the connection and installation can be realized only by selecting the suitable blade root assembly 12. For blade bodies 11 and hubs 222 with different sizes, the connection can be realized by replacing the blade root assembly 12 with corresponding size, so as to match the axial length of the blade body 11 and the size of the connecting pitch circle of the hub 222, and to form the assembled combination of the standardized blade root body and the alternative blade root assembly, so that the blade apparatus for wind power generation 1 has stronger adaptability and higher assembly flexibility.

It should be noted that the number of the blade root segments 121 in this embodiment may be three, as shown in FIG. 1, and of course, it may be two or other numbers more than three, as long as the blade root assembly 12 can be spliced into a body of revolution in the circumferential direction. The situation in the following embodiments may be the same as this embodiment.

Figure 3:
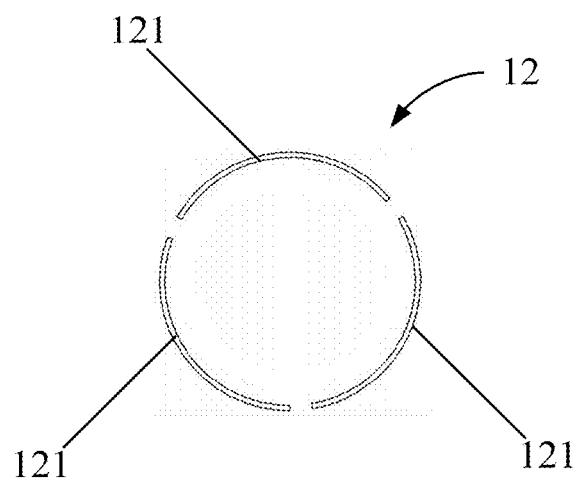
FIG. 3 shows an axial exploded schematic diagram of a blade root assembly of a blade apparatus for wind power generation provided by an embodiment of the present application.

In some embodiments of the present application, as shown in FIGS. 1 to 3, in the blade apparatus for wind power generation 1, the cross section of each blade root segment 121 of the blade root assembly 12 has an arc structure, so that the overall cross section of the blade root assembly 12 has a ring-shaped structure formed by splicing a plurality of arc-shaped segments, so as to facilitate installation and fixation with the blade body 11 and the hub of the wind power generation device. It can be understood that the blade mounting position on the hub of a common wind power generation device is usually a circular structure, such as a circular mounting flange structure. Correspondingly, the end face of the blade body 11 facing the blade root is usually a circular structure, so that the stress of the end face is relatively uniform after connection.

In the axial direction of the blade root assembly 12, each end of each blade root segment 121 is provided with a connection structure; the end of each blade root segment 121 close to the blade body 11 is provided with a first connection structure 1211, and the first connection structure 1211 is matched with the blade-root connecting portion 111 of the blade body 11, to facilitate the connection; and the end of each blade root segment 121 away from the blade body 11 is provided with a second connection structure 1215, and the second connection structure 1215 is matched with the hub of the wind power generation device, to facilitate the connection and assembly of the hub.

In some embodiments of the present application, as shown in FIGS. 1 to 4, in one implementation of the blade apparatus for wind power generation 1, the diameters of the two axial ends of the blade root assembly 12 are equal, that is, the diameter of the end of the blade root assembly 12 used for being connected with the hub is equal to the diameter of the end of the blade root assembly 12 used for being connected to the blade body 11, so as to match with the situation that the diameter of the blade-root connecting portion 111 of the blade body 11 and that of the mounting position on the hub of the wind power generation device are equal.

Figure 4:
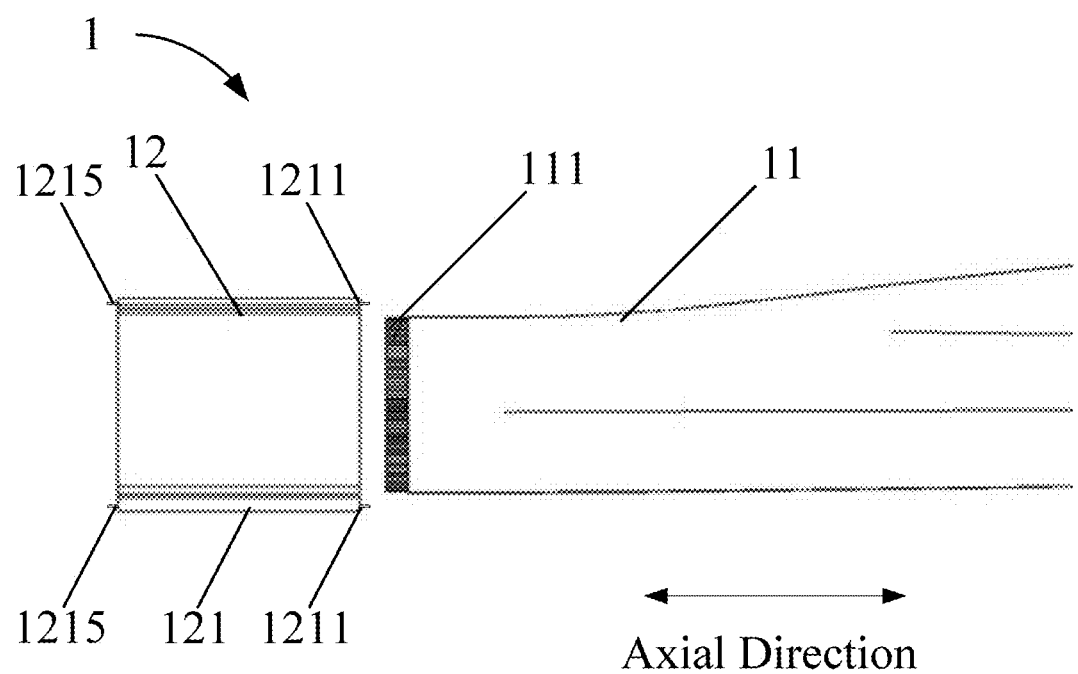
FIG. 4 shows an exploded schematic diagram of a part of a blade apparatus for wind power generation provided by an embodiment of the present application.

Further, as shown in FIG. 4, specifically, the blade root assembly 12 has a hollow cylindrical structure of being axially penetrated. It can be understood that the cylindrical structure is relatively simple, and the corresponding blade root segments 121 have the same radian at any position in the axial direction. The single blade root segment 121 is simple in structure, convenient to manufacture and relatively uniform in stress.

It should be noted that the cylindrical structure is only one of the preferred implementations of the blade root assembly 12 of the present application. The blade root assembly 12 can also adopt a body of revolution with other shape. For example, the diameter of the middle part in the axial direction is larger than that of both ends, as long as it can be matched with the mounting position of the hub and the blade-root connecting portion 111 of the blade body 11, which will not be repeated here.

Figure 5:
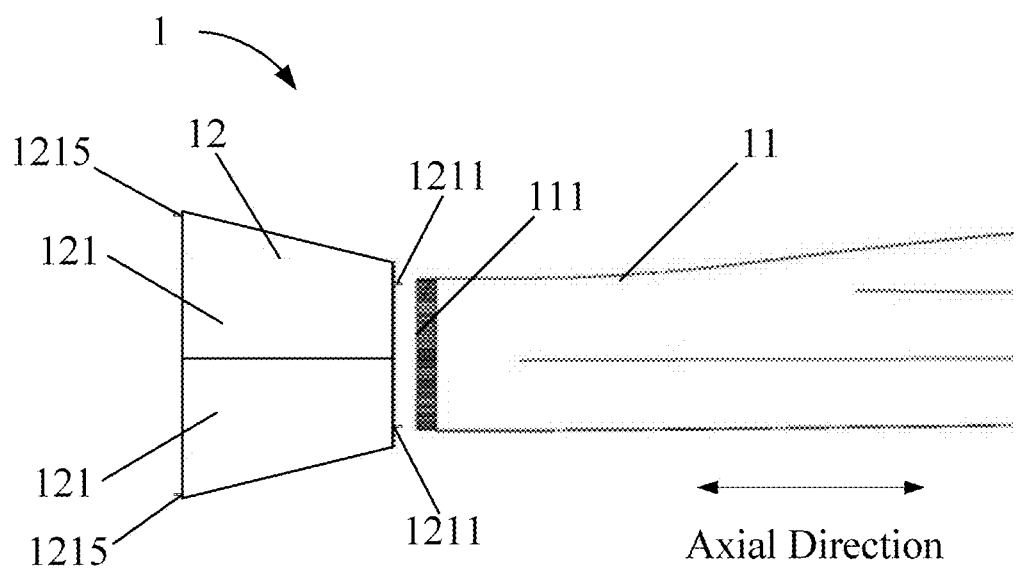
FIG. 5 shows an exploded schematic diagram of another blade apparatus for wind power generation provided by an embodiment of the present application.

In some embodiments of the present application, as shown in FIG. 5, the diameters of two ends of the blade root assembly 12 in the axial direction are different. Specifically, in one of the specific implementations, the diameter of the end of the blade root assembly 12 used for being connected to the hub is larger than that of the end used for being connected to the blade body 11, so as to match with the situation that the diameter of the mounting position on the hub of the wind power generation device is larger than the that of the blade-root connecting portion 111 of the blade body 11. It can be understood that as the length of the blade body 11 is being lengthened, its own weight is also increased, and the load borne by the hub is further increased after installation. In order to meet the stress requirements, the diameter of the mounting position of the hub and the overall dimension of the hub also need to be increased. In some cases, the diameter of the mounting position on the hub is larger than that of the blade connecting portion of the blade body 11. The hub and the blade body 11 in this case can be well matched through the above blade root assembly 12.

Further, as shown in FIG. 5, the blade root assembly 12 has a frustum structure, and the frustum structure is axially penetrated. The end of the frustum structure with a larger diameter is used for being connected to the hub of the wind power generation device, and the end with a smaller diameter is connected to the blade-root connecting portion 111 of the blade body 11. It can be understood that the frustum structure is a regular structure, the corresponding structure of each blade root segment 121 is simple in structure, convenient to manufacture and relatively uniform in stress.

Figure 6:
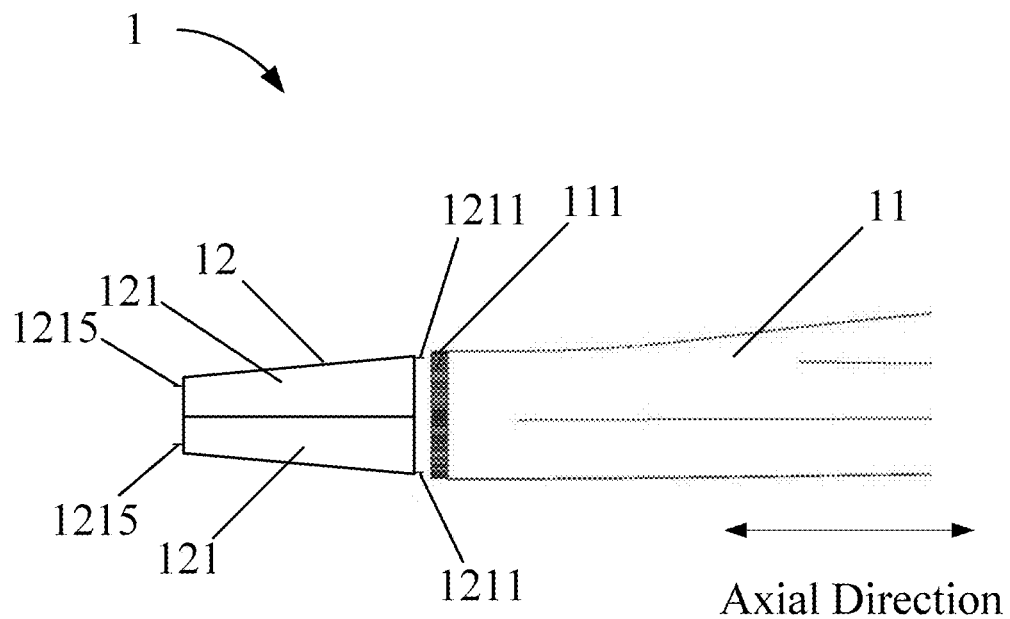
FIG. 6 shows an exploded schematic diagram of another blade apparatus for wind power generation provided by an embodiment of the present application.

In another specific implementation, as shown in FIG. 6, the diameter of the end of the blade root assembly 12 used for being connected to the hub is smaller than that of the end connected to the blade body 11, so as to match with the situation that the diameter of the mounting position on the hub of the wind power generation device is smaller than that of the blade-root connecting portion 111 of the blade body 11. It can be understood that, in practical application, when the connection strength meets the requirements, the diameter of the mounting position on the hub may be smaller than that of the blade connecting portion of the blade body 11. The hub and blade body 11 in this case can be well matched through the above blade root assembly 12.

Further, as shown in FIG. 6, specifically, the blade root assembly 12 has a frustum structure, and the frustum structure is axially penetrated. The end of the frustum structure with a smaller diameter is used for being connected to the hub of wind power generation device, and the end with a larger diameter is connected to the blade-root connecting portion 111 of the blade body 11. The frustum structure is a regular structure, the corresponding structure of each blade root segment 121 is simple in structure, convenient to manufacture and relatively uniform in stress. In addition, the pitch circle size of the mounting position on the hub can be reduced, which is convenient for installation and maintenance.

It should be noted that the frustum structure is one of the preferred implementations of the blade root assembly 12 of the present application. In practical application, the blade root assembly 12 can also adopt body of revolution with other shape, such as a body of revolution with a stepped structure or a body of revolution combined with a cylindrical structure and a conical structure. As long as it can be matched the mounting position on the hub and the dimension of the blade-root connecting portion 111 of the blade body 11, which will not be repeated here.

Further, as shown in FIG. 1 and FIG. 3, in the above examples, a plurality of blade root segments 121 constituting the blade root assembly 12 are all of the same dimension. That is to say, the axial dimension of each blade root segment 121 is the same, and the corresponding radian dimension of each blade root segment 121 on the same cross section is also the same. In this case, a plurality of blade root segments 121 constituting the blade root assembly 12 are components of the same specification. In this way, in the production process, only one kind part needs to be processed, which not only simplifies the production process, but also improves the universality of the blade root segments 121, and any two blade root segments 121 can be replaced with each other, which is beneficial to further reducing the cost.

Figure 7:
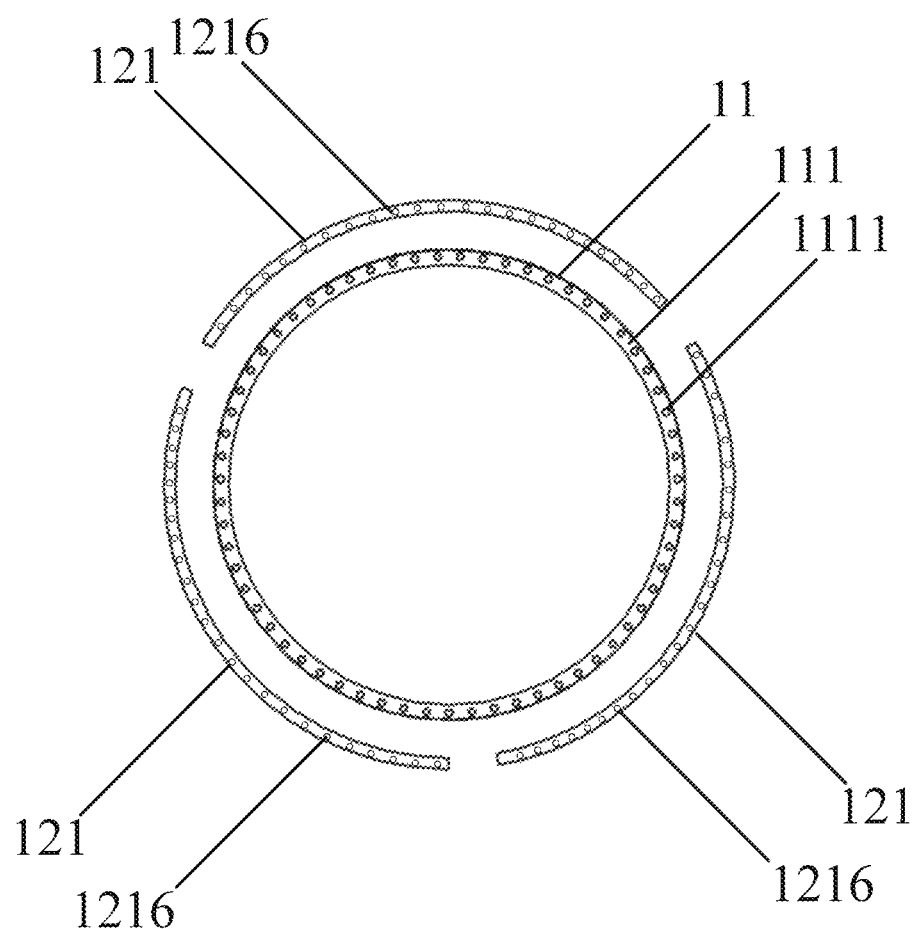
FIG. 7 shows an axial schematic diagram of a blade root assembly and a blade body of a blade apparatus for wind power generation provided by an embodiment of the present application.
Figure 8:
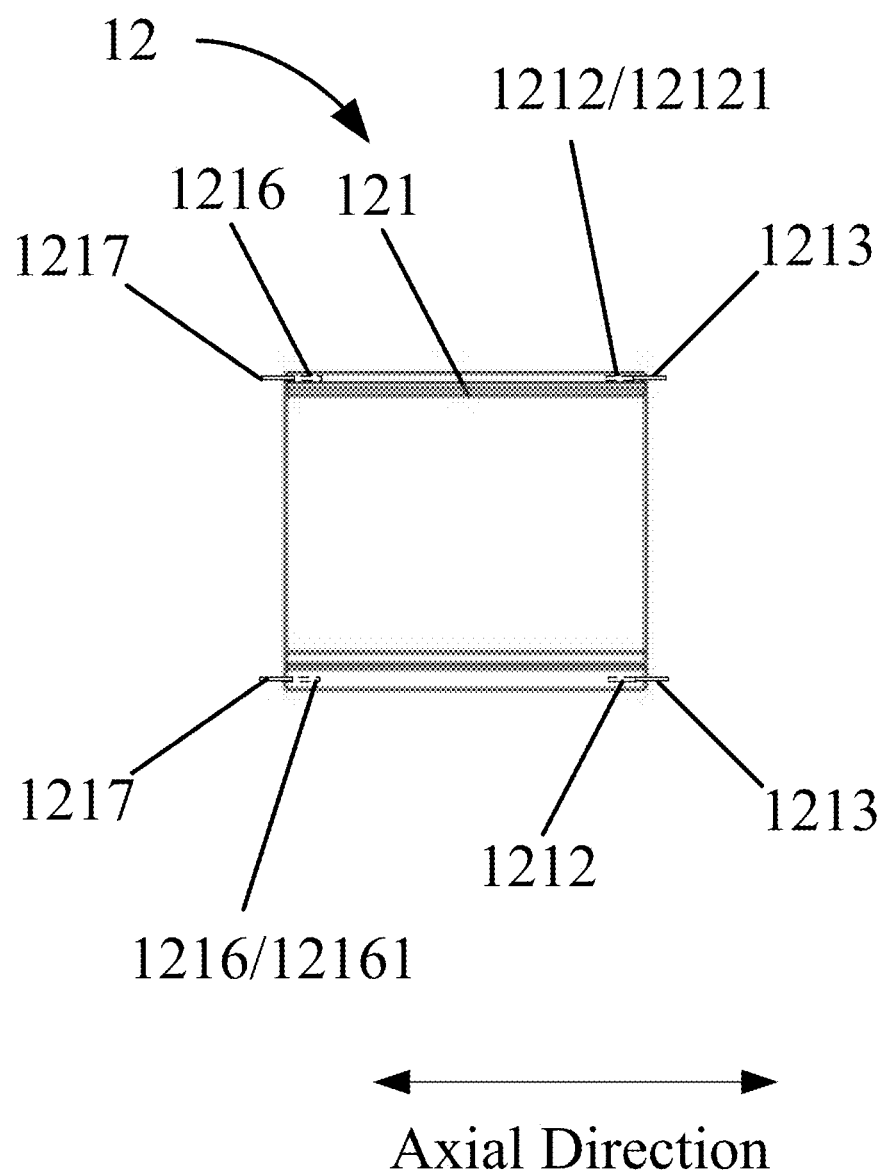
FIG. 8 shows a schematic diagram of a blade root assembly of a blade apparatus for wind power generation provided by an embodiment of the present application.

In some embodiments of the present application, as shown in FIGS. 7 and 8, in the blade apparatus for wind power generation 1, a plurality of bolt connecting holes 1111 are provided on an end face of the blade-root connecting portion 111 of the blade body 11, and the plurality of bolt connecting holes 1111 are arranged at intervals in the circumferential direction. Correspondingly, the first connecting structure 1211 of the blade root assembly 12 includes a plurality of first bolt holes 1212 and a plurality of first studs 1213. The plurality of first bolt holes 1212 correspond to the plurality of bolt connecting holes 1111, respectively. One end of each first stud 1213 is in threaded connection with corresponding one of the plurality of bolt connecting holes 1111, and the other end is in threaded connection with corresponding one of the plurality of first bolt holes 1212, so as to realize the connection and assembly between the blade body 11 and the blade root assembly 12 through studs. When the first bolt holes 1212 and the bolt connecting holes 1111 are uniformly arranged in circumferential direction, the blade body 11 is more uniformly stressed after being connected to the blade root assembly 12.

Similarly, as shown in FIGS. 7 and 8, the second connecting structure 1215 of the blade root assembly 12 includes a plurality of second bolt holes 1216 and a plurality of second studs 1217. The plurality of second bolt holes 1216 are arranged at intervals in the circumferential direction, and the hub of the wind power generation device is also provided with corresponding connecting holes. When the blade root assembly 12 is connected and fixed to the hub, one end of each second stud 1217 is in threaded connection with corresponding one of the plurality of second bolt holes 1216, and the other end is in threaded connection with corresponding one of connecting holes on the hub, so that the blade root assembly 12 and the hub can be connected and assembled through the second studs 1217. When the second bolt holes 1216 and the connecting holes on the hub are uniformly arranged in circumferential direction, the blade root assembly 12 is more uniformly stressed after being connected with the hub.

Further, the blade root segments 121 of the blade root assembly 12 may be made of different materials. When the blade root segments 121 are made of steel, the first bolt holes 1212 and the second bolt holes 1216 can be directly formed on the blade root segments 121 by drilling only, and this is simple and convenient in processing. When the blade root segments 121 are made of fiber-reinforced plastic, embedded bolt sleeve structures may be respectively arranged at both ends of the blade root segment 121, and the bolt sleeve structures can be made of steel. The first bolt holes 1212 are formed in the bolt sleeve structures on the end near the blade body 11, and the second bolt holes 1216 are formed in the bolt sleeve structures on the end away from the blade body 11. When the blade root segment 121 is poured and molded, the bolt sleeve structures and the blade root segment 121 are infused into an integrated structure, so as to prevent the cracking phenomenon caused by directly drilling holes in the blade root segment 121 of fiber-reinforced plastic.

Figure 9:
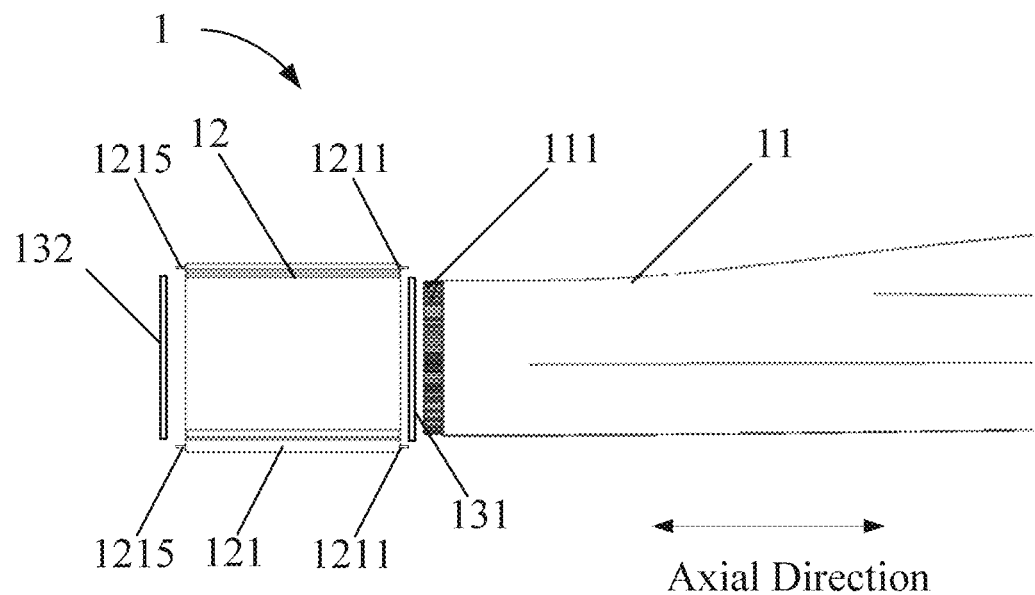
FIG. 9 shows an exploded schematic diagram of a part of a blade apparatus for wind power generation provided by an embodiment of the present application.
Figure 10:
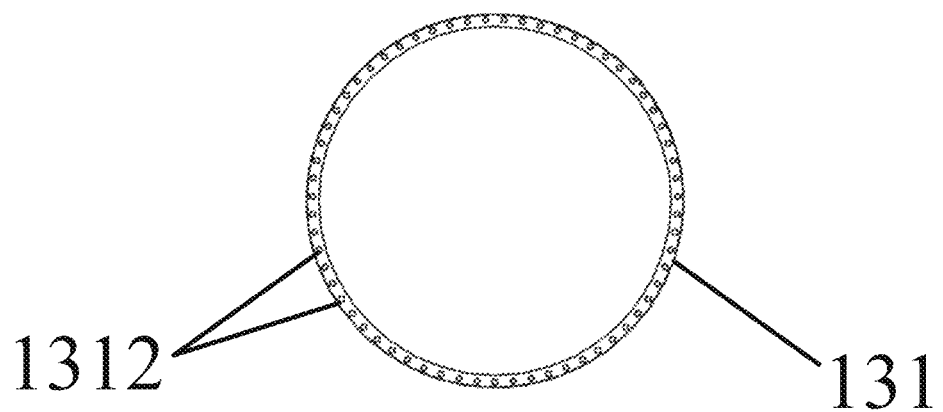
FIG. 10 shows an axial schematic diagram of a first flange ring of a blade apparatus for wind power generation provided by an embodiment of the present application.

In some embodiments of the present application, as shown in FIGS. 9 and 10, the blade apparatus for wind power generation 1 further includes a first flange ring 131. The first flange ring 131 is arranged between the blade root assembly 12 and the blade body 11; the shape and dimension of the first flange ring 131 are matched with the blade root assembly 12 and the blade-root connecting portion 111 of the blade body 11, and the first flange ring 131 is provided with a plurality of first through holes 1312. The plurality of first through holes 1312 are arranged at intervals in the circumferential direction of the first flange ring 131, and each first through hole 1312 extends in the axial direction. The number and dimension of the first through holes 1312 are matched with the first studs 1213. Each first stud 1213 corresponds to one first through hole 1312 and one bolt connecting hole 1111 on the blade body 11. Each first stud 1213 passes through its corresponding first through hole 1312 on the first flange ring 131, and its two ends are respectively in threaded connection with its corresponding first bolt hole 1212 of the blade root segment 121 and its corresponding bolt connecting hole 1111 of the blade body 11, so as to form a detachable connection with the blade root assembly 12 and the blade body 11.

In the present embodiment, with an addition of the first flange ring 131 between the blade root assembly 12 and the blade body 11, an enhanced effect is realized, which is beneficial to improve the connection strength between the blade root assembly 12 and the blade body 11.

Similarly, as shown in FIG. 9, the blade apparatus for wind power generation 1 may further includes a second flange ring 132, the second flange ring 132 is provided on one end of the blade root assembly 12 used for being connected to the hub of the wind power generation device. The structure of the second flange ring 132 is similar to that of the first flange ring 131 shown in FIG. 10, and the shape and structure of the second flange ring 132 are matched with the connecting pitch circle of the hub and the end of the blade root assembly 12 used for being connected to the hub. The second flange ring 132 is provided with a plurality of second through holes 1322 which are arranged at intervals in the circumferential direction of the second flange ring 132, and each second through hole 1322 extends in the axial direction. Each second stud 1217 corresponds to one second through hole 1322 and one connecting hole on the hub. Each second stud 1217 passes through its corresponding second through hole 1322 on the second flange ring 132, and its two ends are respectively in threaded connection with its corresponding second bolt hole 1216 of the blade root segment 121 and its corresponding connecting hole on the hub, to form a detachable connection between the blade root assembly 12 and the hub. The second flange ring 132 is added between the blade root assembly 12 and the hub to enhance the connection strength between the blade root assembly 12 and the hub.

It should be noted that the first through hole 1312 and the second through hole 1322 may be unthreaded holes or threaded holes. Of course, it may also be possible that only one of the first flange ring 131 and the second flange ring 132 is provided in the blade apparatus for wind power generation 1.

Figure 11:
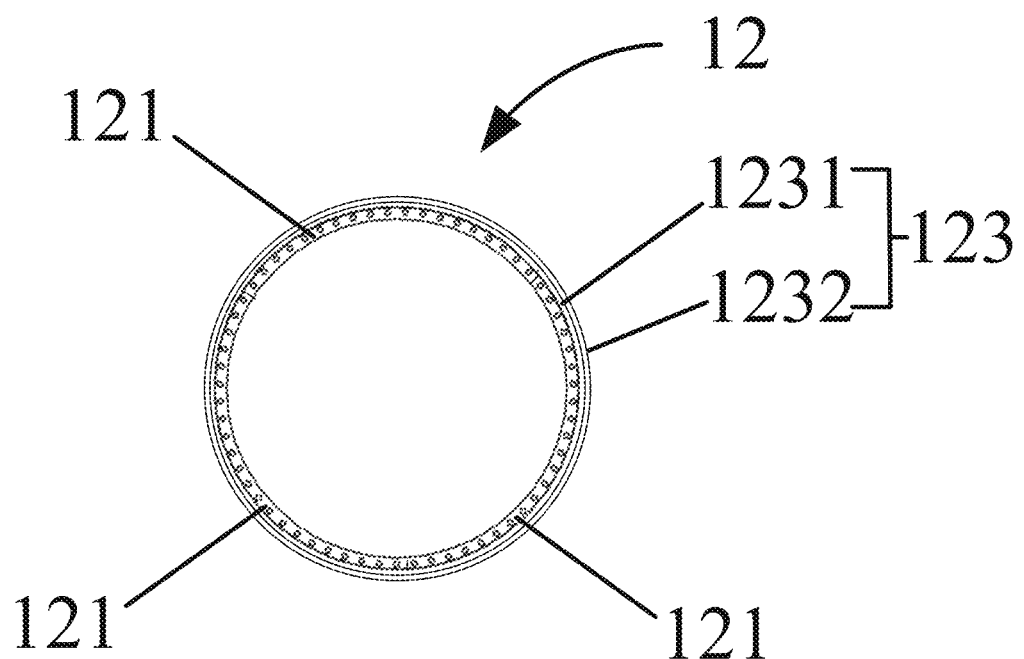
FIG. 11 shows an axial schematic diagram of a blade root assembly of a blade apparatus for wind power generation provided by an embodiment of the present application.

In some embodiments of the present application, as shown in FIG. 11, in the blade apparatus for wind power generation 1, the blade root assembly 12 further includes a surface layer structure 123. The surface structure 123 includes a flexible cover 1231 and a fixed layer 1232. The flexible cover 1231 may be made of fiberglass fabric; the flexible cover 1231 is arranged in the circumferential direction of the blade root assembly 12, and covers the outer surfaces of a plurality of the blade root segments 121. The fixed layer 1232 is formed by infusing the infusing material, and the infusing material may be resin and other materials. The infusing material covers the outer surfaces of the flexible cover 1231 and the blade root segments 121. The infusing material becomes the fixed layer 1232 after curing, and connects with the flexible cover 1231 and the outer surface of the blade root segments 121. In the specific manufacturing process, after the blade root assembly 12 is connected to the blade body 11, laying and infusing of the surface layer structure 123 are performed on the outer surface of the blade root assembly 12.

In this embodiment, by arranging the surface layer structure 123 on the outer surface of the blade root assembly 12, the aerodynamic shape of the blade root assembly 12 may be more smooth, which is conducive to reducing the air resistance and improving the aerodynamic performance and structural stability of the blade apparatus for wind power generation 1 during use.

Figure 12:
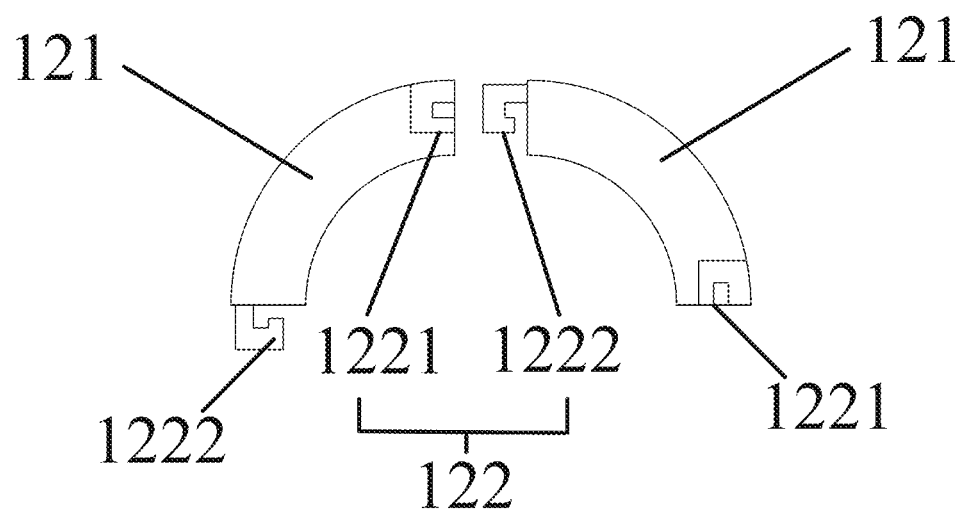
FIG. 12 shows a schematic diagram of a third connection structure of a blade apparatus for wind power generation provided by an embodiment of the present application.

In some embodiments of the present application, as shown in FIGS. 1 and 12, the blade apparatus for wind power generation 1 may be provided with a plurality of third connecting structures 122. Each third connecting structure 122 is provided at a junction of any two adjacent blade root segments 121 in the circumferential direction of the blade root assembly 12, so that the any two adjacent blade root segments 121 can be detachably connected to each other through the third connecting structure 122, thereby enhancing the overall strength of the blade root assembly 12 and benefiting the stress distribution of the blade root assembly 12.

Further, as shown in FIG. 12, the third connecting structure 122 includes a slot structure 1221 and a hook structure 1222. Specifically, between two adjacent blade root segments 121, the slot structure 1221 is provided on one of the two blade root segments 121, and is located at the side edge in the circumferential direction; the hook structure 1222 is arranged on the other blade root segment 121, and the hook structure 1222 is located at a position opposite to the slot structure 1221 in the circumferential direction. The two adjacent blade root segments 121 are connected through the engaging between the hook structure 1222 and the slot structure 1221, so that any two adjacent blade root segments 121 can be connected to each other when a plurality of blade root segments 121 are assembled into the blade root assembly 12 of a body of revolution, thereby enhancing the overall strength of the blade root assembly 12. When the assembly is completed, the overall stress of the blade root assembly 12 can be transmitted among different blade root segments 121, so that the overall stress can be more uniform.

Specifically, as shown in the example in FIG. 12, the hook structure 1222 and the slot structure 1221 can be respectively arranged on different sides of the two blade root segments 121. When the hook structure 1222 engages with the slot structure 1221, there is a measure of overlap between the two blade root segments 121 in the radial direction. Of course, the slot structure 1221 and the hook structure 1222 can also be respectively arranged on the end faces of the junctions of the two blade root segments 121, and the slot structure 1221 runs through in the axial direction, and the hook structure 1222 can extend into the slot structure 1221 from one end of the slot structure 1221, so that the engagement can also be realized.

It should be noted that the number of third connecting structure(s) 122 located between two adjacent blade root segments 121 may be one or more. In a case that a plurality of third connecting structures 122 are provided, a plurality of slot structures 1221 may be provided on one of the two adjacent blade root segments 121, and a plurality of hook structures 1222 may be correspondingly provided on the other one of the two adjacent blade root segments 121. Of course, one blade root segment 121 may be provided with a slot structure 1221 and a hook structure 1222, while the other blade root segment 121 is correspondingly provided with a hook structure 1222 and a slot structure 1221, so that the slot structures 1221 and the hook structures 1222 correspond respectively, thus further improving the connection strength.

The following is a specific embodiment of the blade apparatus for wind power generation 1 of the present application.

As shown in FIGS. 1 and 2, the blade apparatus for wind power generation 1 includes a blade body 11 and a blade root assembly 12. The blade body 11 and the blade root assembly 12 are split structures; one end of the blade body 11 is provided with a blade-root connecting portion 111 for being connected to the blade root assembly 12. When the blade apparatus for wind power generation 1 is used in the wind power generation device, one end of the blade root assembly 12 is detachably connected to the blade-root connecting portion 111 of the blade body 11, the other end of the blade root assembly 12 is detachably connected to the hub of the wind power generation device, so as to realize the connection and fixation between the blade body 11 and the hub of the wind power generation device through the blade root assembly 12. The blade body 11 drives the blade root assembly 12 and the hub to rotate under the wind force, so as to provide power for the wind power generation device.

As shown in FIGS. 1 to 3, the blade root assembly 12 includes a plurality of split blade root segments 121 and a surface layer structure arranged on the outer surfaces of the blade root segments 121. The number of blade root segments 121 may be three blade root segments 121 as shown in FIG. 3, and each blade root segment 121 has an arc-shaped cross section. the plurality of blade root segments 121 are arranged sequentially in the circumferential direction of the blade body 11 to form the blade root assembly 12 having a structure of a body of revolution, so as to be connected to the blade body 11 and the hub of the wind power generation device. As shown in FIG. 3 and FIG. 4, the plurality of blade root segments 121 are all of the same dimension structure, and any two blade root segments 121 can be replaced with each other, so that the plurality of the blade root segments 121 constituting the blade root assembly 12 are components of the same specification. In this way, in the production process, only one kind part needs to be processed, which not only simplifies the production process, but also improves the universality of the blade root segments 121, which is beneficial to further reducing the cost.

As shown in FIG. 4, one end of each blade root segment 121 close to the blade body 11 is provided with a first connection structure 1211, the first connection structure 1211 is matched with the blade-root connecting portion 111 of the blade body 11, and the first connection structure 1211 is used for connecting and assembling with the blade root connecting part 111 of the blade body 11; the end of the blade root segment 121 away from the blade body 11 is provided with a second connecting structure 1215, and the second connecting structure 1215 is used for connecting and assembling with the hub.

As shown in FIG. 7 and FIG. 8, the end face of the blade-root connecting portion 111 of the blade body 11 is provided with a plurality of bolt connecting holes 1111 uniformly arranged in the circumferential direction. Correspondingly, the first connecting structure 1211 of the blade root assembly 12 includes a plurality of first bolt holes 1212 and a plurality of first studs 1213. The first bolt holes 1212 correspond to the bolt connecting holes 1111, respectively. One end of each first stud 1213 is in threaded connection with one bolt connecting hole 1111, and the other end is in threaded connection with a corresponding first bolt hole 1212, so as to realize the connection and assembly between the blade body 11 and the blade root assembly 12 through studs.

Similarly, as shown in FIGS. 7 and 8, the second connecting structure 1215 of the blade root assembly 12 includes a plurality of second bolt holes 1216 and a plurality of second studs 1217. The plurality of second bolt holes 1216 are uniformly arranged in the circumferential direction, and the hub of the wind power generation device is also provided with corresponding connecting holes. When the blade root assembly 12 is connected and fixed to the hub, one end of each second stud 1217 is in threaded connection with a second bolt hole 1216, and the other end is in threaded connection with a corresponding connecting hole on the hub, so that the blade root assembly 12 and the hub can be connected and assembled through the second studs 1217.

When the blade root segment 121 is made of steel, the first bolt hole 1212 and the second bolt hole 1216 can be directly formed on the blade root segment 121 by drilling only. When the blade root segment 121 is made of fiber-reinforced plastic, embedded bolt sleeve structures may be respectively arranged at both ends of the blade root segment 121, and the bolt sleeve structures can be made of steel. The first bolt holes 1212 are formed in the bolt sleeve structures on the end near the blade body 11, and the second bolt holes 1216 are formed in the bolt sleeve structures on the end away from the blade body 11. The bolt sleeve structures and the blade root segment 121 are infused into an integrated structure, so as to prevent the cracking phenomenon caused by directly drilling holes in the blade root segment 121 of fiber-reinforced plastic.

As shown in FIGS. 1 to 4, in a specific implementation of the blade root assembly 12, the blade root assembly 12 is specifically a hollow cylindrical structure which is axially penetrated. The diameters of both ends of the blade root assembly 12 in the axial direction is equal. The cylindrical structure is relatively simple, and the corresponding blade root segments 121 have the same radian at any position in the axially direction. A single blade root segment 121 is simple in structure, convenient to manufacture and relatively uniform in stress.

In another implementation of the blade root assembly 12, the diameters of both ends of the blade root assembly 12 in the axial direction are different. In one case, as shown in FIG. 5, the diameter of one end of the blade root assembly 12 used for being connected to the hub is larger than that of one end used for being connected to the blade body 11. Specifically, the blade root assembly 12 has a frustum structure, and the frustum structure is axially penetrated. The end of the frustum structure with a larger diameter is used for being connected to the hub of the wind power generation device, and the end with a smaller diameter is connected to the blade-root connecting portion 111 of the blade body 1, so as to match with the situation that the diameter of the mounting position on the hub of the wind power generation device is larger than that of the blade-root connecting portion 111 of the blade body 11. The frustum structure is a regular structure, the corresponding structure of each blade root segment 121 is simple in structure, convenient to manufacture and relatively uniform in stress.

In another case, as shown in FIG. 6, the diameter of the end of the blade root assembly 12 used for being connected to the hub is smaller than that of the other end used for being connected to the blade body 11. Specifically, the blade root assembly 12 has a frustum structure, and the frustum structure is axially penetrated. The end of the frustum structure with a smaller diameter is used for being connected to the hub of wind power generation device, and the other end with a larger diameter is connected to the blade-root connecting portion 111 of the blade body 11, so as to match with the situation that the diameter of the mounting position on the hub of the wind power generation device is smaller than that of the blade-root connecting portion 111 of the blade body 11. The frustum structure is a regular structure, the corresponding structure of each blade root segment 121 is simple in structure, convenient to manufacture and relatively uniform in stress.

As shown in FIG. 11, the surface layer structure 123 of the blade root assembly 12 includes a flexible cover 1231 and a fixed layer 1232. The flexible cover 1231 may be made of fiberglass fabric, the flexible cover 1231 is arranged in circumferential direction of the blade root assembly 12, and covers the outer surfaces of the plurality of the blade root segments 121. The fixed layer 1232 is formed by infusing the infusing material like resin and other materials. the infusing material covers the outer surfaces of the flexible cover 1231 and the blade root segments 121, the infusing material becomes the fixed layer 1232 after curing, and the infusing material connects with the flexible cover 1231 and the outer surface of the blade root segment 121. In the specific manufacturing process, after the blade root assembly 12 is connected to the blade body 11, laying and infusing of the surface layer structure 123 are performed on the outer surface of the blade root assembly 12.

As shown in FIGS. 9 and 10, the blade apparatus for wind power generation 1 further includes a first flange ring 131 and a second flange ring 132. The first flange ring 131 is arranged between the blade root assembly 12 and the blade body 11; the second flange ring 132 is arranged between the blade root assembly 12 and the hub of the wind power generation device.

The shape and dimension of the first flange ring 131 are matched with the blade root assembly 12 and the blade-root connecting portion 111 of the blade body 11, and the first flange ring 131 is provided with a plurality of first through holes 1312. The plurality of first through holes 1312 are arranged at intervals in the circumferential direction of the first flange ring 131, and each first through hole 1312 extends in the axial direction. Both the number and the dimension of the first through holes 1312 are matched with the first studs 1213. Each first stud 1213 corresponds to a first through hole 1312 and a bolt connecting hole 1111 on the blade body 11. The first stud 1213 passes through its corresponding first through hole 1312 on the first flange ring 131, and its two ends are respectively in threaded connection with the first bolt hole 1212 of the blade root segment 121 and the bolt connecting hole 1111 of the blade body 11, to form a detachable connection with the blade root assembly 12 and the blade body 11.

Similarly, the shape and structure of the second flange ring 132 are matched with the connecting pitch circle of the hub and one end of the blade root assembly 12 used for being connected the hub. The second flange ring 132 is provided with a plurality of second through holes 1322, the plurality of second through holes 1322 are arranged at intervals in circumferential direction of the second flange ring 132, and each second through hole 1322 extends in the axial direction. Each second stud 1217 corresponds to a second through hole 1322 and a connecting hole on the hub. The second stud 1217 passes through its corresponding second through hole 1322 on the first flange ring 131, and its two ends are respectively in threaded connection with the second bolt hole 1216 of the blade root segment 121 and its corresponding connecting hole on the hub, to form a detachable connection between the blade root assembly 12 and the hub. The first through hole 1312 and the second through hole 1322 may be unthreaded holes or threaded holes. By adding the first flange ring 131 and the second flange ring 132, the connection strengths between the blade root assembly 12, the blade body 11 and the hub is enhanced.

As shown in FIG. 12, a third connecting structure 122 is further provided at the junction of two adjacent blade root segments 121 in the circumferential direction of the blade root assembly 12, so that the two adjacent blade root segments 121 can be detachably connected to each other. Specifically, as shown in FIG. 8, the third connecting structure 122 includes a slot structure 1221 and a hook structure 1222. Between the two adjacent blade root segments 121, the slot structure 1221 is provided on one of the two blade root segments 121, and is located at the side edge in the circumferential direction. The hook structure 1222 is arranged on the other blade root segment 121, and the hook structure 1222 is located at a position opposite to the slot structure 1221 in the circumferential direction. Two adjacent blade root segments 121 are connected through the engaging between the hook structure 1222 and the slot structure 1221, so that any two adjacent blade root segments 121 can be connected with each other when the plurality of blade root segments 121 are assembled into the blade root assembly 12 of a body of revolution, thereby enhancing the overall strength of the blade root assembly 12, so that the overall stress can be more uniform.

As shown in FIG. 8, the hook structure 1222 and the slot structure 1221 may be respectively arranged on different sides of the two blade root segments 121. Otherwise, as shown in FIG. 8, the slot structure 1221 runs through in the axial direction, and the hook structure 1222 may extend into the slot structure 1221 from one end of the slot structure 1221.

In the blade apparatus for wind power generation 1 provided by this embodiment, the structure and assembly mode of the blade root assembly 12 are optimized and improved. The blade root assembly 12 is formed by splicing a plurality of the blade root segments 121, so that the dimension of a single blade root segment 121 is greatly reduced, and the manufacture and transportation can be carried out independently. The plurality of blade root segments 121 can be assembled together when they are mounted on the hub of wind power generation device, thus effectively reducing the difficulties in manufacture and transportation. Meanwhile, the overall size of the blade root assembly 12 can be further increased to match with the larger blade body 11, which is beneficial to further improve the swept area of blade and generated output of the wind power generation device.

The plurality of blade root segments 121 constituting the blade root assembly 12 are all of the same structure, which further reduces the types of components. In this way, only one type component needs to be processed, which simplifies the production process. In addition, any two blade root segments 121 can be replaced with each other, which is more versatile. The first flange ring 131 and the second flange ring 132 further improve the connection strength of the blade apparatus for wind power generation 1. After the blade root assembly 12 is assembled with the blade body 11, the surface structure 123 is processed on the outer surface of the blade root assembly 12, which makes the aerodynamic shape of the blade root assembly 12 smoother and further improves the aerodynamic performance and structural stability of the blade apparatus for wind power generation 1.

In addition, since the blade root assembly 12 and the blade body 11 are configured to be detachable, and since the blade root assembly 12 can be disassembled in to multiple components, the adaptability is stronger, and the blade root assembly 12 of different specifications can be developed according to the use needs. Therefore, when the blade bodies 11 with different dimensions are being assembled with the hub, the connection and installation can be realized only by selecting the suitable blade root assembly 12. For blade bodies 11 and hubs with different dimensions and specifications, the connection can be realized by replacing the blade root assembly 12 with corresponding dimension and specification, so as to match the axial length of the blade body 11 and the dimension of the connecting pitch circle of the hub 222, so that the blade apparatus for wind power generation 1 has stronger adaptability and higher assembly flexibility.

Figure 13:
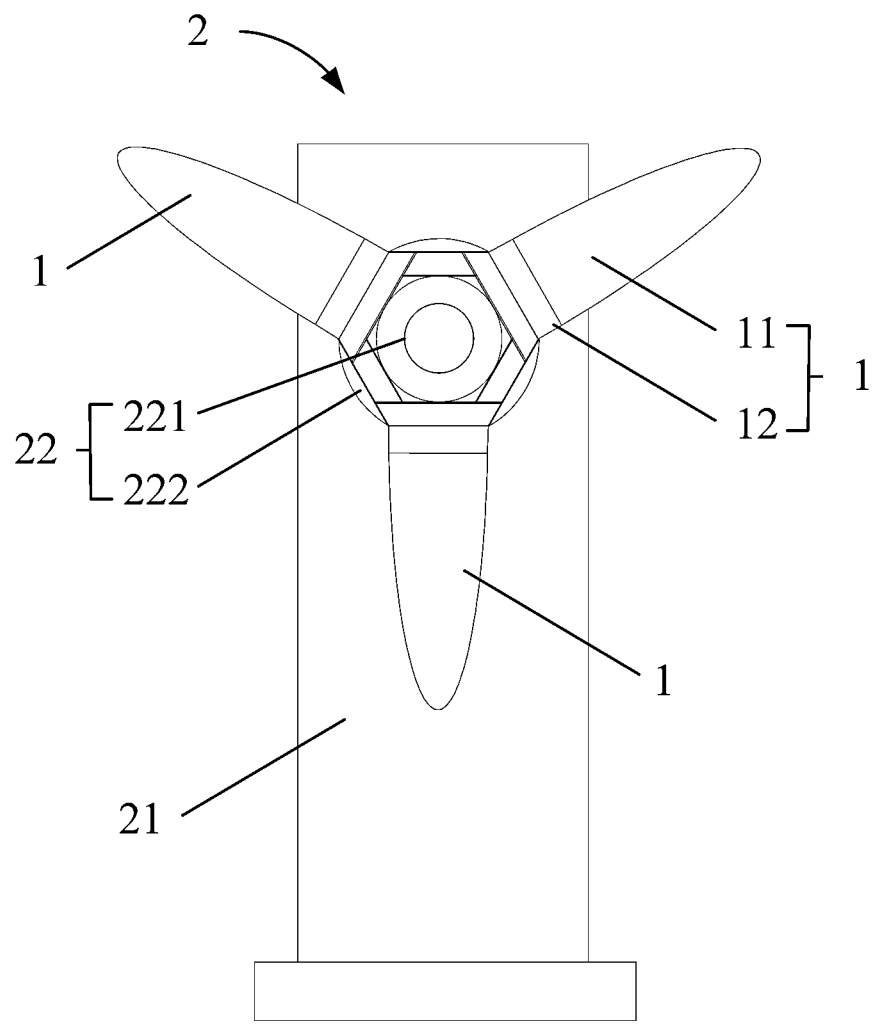
FIG. 13 shows a schematic diagram of a wind power generation device provided by an embodiment of the present application.

Embodiments of the second aspect of the present application further provide a wind power generation device 2. As shown in FIGS. 1 and 13, the wind power generation device 2 includes a supporting tower 21, a main body 22, and at least one blade apparatus for wind power generation 1 in the embodiments of the first aspect described above.

The supporting tower 21 is used for supporting and fixing; the main body 22 is arranged on the supporting tower 21. The main body 22 includes a power generation apparatus 221 and a hub 222. The hub 222 is rotatably connected to the supporting tower 21, and the hub 222 is in transmission connection with the input end of the power generation apparatus 221. At least one blade apparatus for wind power generation 1 provided in the abovementioned embodiments of the first aspect is arranged on the hub 222 at intervals in the circumferential direction. The blade body 11 of the blade apparatus for wind power generation 1 is connected with the hub 222 through the blade root assembly 12. The blade body 11 drives the hub 222 through the blade root assembly 12 to rotate under the wind force to provide power for wind power generation device, and to drive the power generation apparatus 221 to run, thus realizing wind power generation.

Because the blade root assembly 12 and the blade body 11 adopt a split configuration, and the blade root assembly 12 adopts a segmented configuration, the difficulties of the blade root assembly 12 in the manufacture and transportation are greatly reduced, the dimension restrictions of the blade root assembly 12 and the blade body 11 are avoided, and the blade body 11 with a larger dimension can be assembled, so as to further improve the swept area of blade and generated output of wind power generation device 2. For blade bodies 11 and hubs 222 with different dimensions, the connection to which can be realized by replacing the blade root assembly 12 with corresponding dimension, so as to match the axial length of the blade body 11 and the dimension of the connecting pitch circle of the hub 222, resulting in a higher adaptability of blade apparatus for wind power generation and a higher assembly flexibility.

It should be noted that the number of blade apparatus for wind power generation 1 in the wind power generation device 2 is not limited to three (as shown in FIG. 13), but may be two or other numbers greater than three. all the blade apparatuses on the hub 222 could be blade apparatus for wind power generationes 1 (for example, the state shown in FIG. 12), or among all of the blade apparatuses of the hub 222, a part of them amay be blade apparatus for wind power generation 1, and the other part may be common blade apparatus, that is, blade apparatus for wind power generation 1 and common blade apparatus form a combination, and the hub 222 is driven to rotate through cooperation of them.

In addition, the wind power generation device 2 in this embodiment also has all the beneficial effects of the blade apparatus for wind power generation 1 in any of the above embodiments, which will not be repeated here.

The basic principle of the present application has been described above with reference to specific embodiments. However, it should be pointed out that the advantages, advantages, effects, etc. mentioned in the present application are only examples rather than limitations, and these advantages, advantages, effects, etc. cannot be considered as necessary for each embodiment of the present application. In addition, the specific details disclosed above are only for the purpose of illustration and ease of understanding, rather than limitation, and the above details do not limit that the present application must be implemented with the above specific details.

The block diagrams of device, apparatus, plant and system involved in the present application are only illustrative examples and are not intended to require or imply that they must be connected, arranged and configured in the manner shown in the block diagrams. As those skilled in the art will realize, these device, apparatus, plant and system can be connected, arranged and configured in any way. Words such as "include", "comprise" and "have" are open words, which mean "including but not limited to" and can be used interchangeably with them. As used here, the words "or" and "and" refer to the words "and/or" and can be used interchangeably with them unless the context clearly indicates otherwise. The word "such as" used here refers to the phrase "such as but not limited to" and can be used interchangeably with it. It should also be pointed out that in the device and equipment of the present application, the components can be disassembled and/or reassembled. These decomposition and/or recombination should be regarded as the equivalent scheme of the present application.

The above description has been given for the purpose of illustration and description. Furthermore, this description is not intended to limit the embodiments of this application to the forms disclosed herein. Although a number of example aspects and embodiments have been discussed above, those skilled in the art will recognize some variations, modifications, changes, additions and sub combinations thereof.

The above description of the disclosed aspects is provided to enable any person skilled in the art to make or use the present application. Various modifications to these aspects will be obvious to those skilled in the art, and the general principles defined herein can be applied to other aspects without departing from the scope of the present application. Therefore, the application is not intended to be limited to the aspects shown here, but is to be accorded the widest scope consistent with the principles and novel features of the application herein.

The above are only preferred embodiments of the present application, and are not intended to limit the present application. Any modification, equivalent substitution, etc. made within the spirit and principle of the present application should be included in the scope of protection of the present application.

What is claimed is:

1. A blade apparatus for wind power generation, comprising:
    a blade body, one end of the blade body being provided with a blade-root connecting portion, wherein a cross section of each blade root segment has an arc structure; in an axial direction of the blade root assembly, one end of each blade root segment is provided with a first connection structure matched with the blade-root connecting portion, and the other end of each blade root segment is provided with a second connection structure matched with a hub of a wind power generation device;
    a blade root assembly, comprising a plurality of blade root segments, the plurality of blade root segments being arranged in a circumferential direction of the blade body to form a body of revolution, and each blade root segment being detachably connected to a corresponding portion of the blade-root connecting portion, wherein a plurality of bolt connecting holes are provided on an end face of the blade-root connecting portion, and the plurality of the bolt connecting holes are arranged at intervals in a circumferential direction; and the first connection structure comprises a plurality of first bolt holes and a plurality of first studs; the plurality of the first bolt holes are arranged at intervals in the circumferential direction, and arranged opposite to the plurality of bolt connecting holes; one end of each first stud is in threaded connection with corresponding one of the plurality of bolt connecting holes, and the other end of each first stud is in threaded connection with corresponding one of the plurality of first bolt holes; and
    a first flange ring, arranged between the blade root assembly and the blade body, wherein the first flange ring being provided with a plurality of first through holes extending in an axial direction, the plurality of first through holes being arranged at intervals in the circumferential direction, the plurality of first studs respectively passing through the plurality of first through holes and being connected to the blade root assembly and the blade body.

2. The blade apparatus for wind power generation of claim 1, wherein,
    a diameter of an end of the blade root assembly used for being connected to the hub is equal to a diameter of an end of the blade root assembly used for being connected to the blade body.

3. The blade apparatus for wind power generation of claim 2, wherein
    the blade root assembly has a cylindrical structure of being axially penetrated.

4. The blade apparatus for wind power generation of claim 1, wherein,
    a diameter of an end of the blade root assembly used for being connected to the hub is greater or less than a diameter of an end of the blade root assembly used for being connected to the blade body.

5. The blade apparatus for wind power generation of claim 4, wherein the blade root assembly has a frustum structure of being axially penetrated.

6. The blade apparatus for wind power generation of claim 1, wherein
    a plurality of the blade root segments have structures of a same dimension.

7. The blade apparatus for wind power generation of claim 1, wherein
    the second connection structure comprises a plurality of second bolt holes and a plurality of second studs, the plurality of second bolt holes are arranged at intervals in the circumferential direction; one end of each second stud is in threaded connection with corresponding one of the plurality of second bolt holes, and the other end of each second stud is in threaded connection with corresponding one of a plurality of connecting holes on the hub.

8. The blade apparatus for wind power generation of claim 7, wherein
    the plurality of blade root segments are steel structures, the plurality of first bolt holes and the plurality of second bolt holes are formed by direct drilling.

9. The blade apparatus for wind power generation of claim 7, wherein the plurality of blade root segments are fiber-reinforced plastic structures, and each end of each blade root segment is embedded with bolt sleeve structures, wherein bolt sleeve structures located at one end of each blade root segment are provided with the plurality of first bolt holes, respectively, and bolt sleeve structures located at the other end of each blade root segment are provided with the plurality of second bolt holes, respectively.

10. The blade apparatus for wind power generation of claim 7, further comprising:
    a second flange ring, arranged between the blade root assembly and the hub, the second flange ring being provided with a plurality of second through holes, the plurality of second through holes being arranged at intervals in the circumferential direction, the plurality of second studs respectively passing through the plurality second through holes and being connected to the blade root assembly and the hub.

11. The blade apparatus for wind power generation of claim 1, wherein the blade root assembly further comprises:
    a surface layer structure, comprising a flexible cover and a fixed layer, wherein the flexible cover is arranged in a circumferential direction of the blade root assembly and covers outer surfaces of the plurality of the blade root segments, and the fixing layer is formed by infusing an infusing material and covers outer surfaces of the flexible cover and the plurality of blade root segments.

12. The blade apparatus for wind power generation of claim 1, wherein
    in a circumferential direction of the blade root assembly, a third connection structure is provided at a junction between adjacent two blade root segments, and the adjacent two blade root segments are connected to each other by the third connection structure.

13. The blade apparatus for wind power generation of claim 12, wherein the third connection structure comprises:

a slot structure, arranged at a side edge of one of the adjacent two blade root segments in the circumferential direction; and a hook structure, arranged at a position of the other one of the adjacent two blade root segments opposite to the slot structure in the circumferential direction, the hook structure engaging with the slot structure.

14. A wind power generation device, comprising:

a supporting tower;

a main body, comprising a power generation apparatus and a hub, the main body being arranged on the supporting tower, and the hub being in transmission connection with an input end of the power generation apparatus; and at least one blade apparatus for wind power generation of claim 1, connected to the hub.

\* \* \* \* \*